Figure 1:
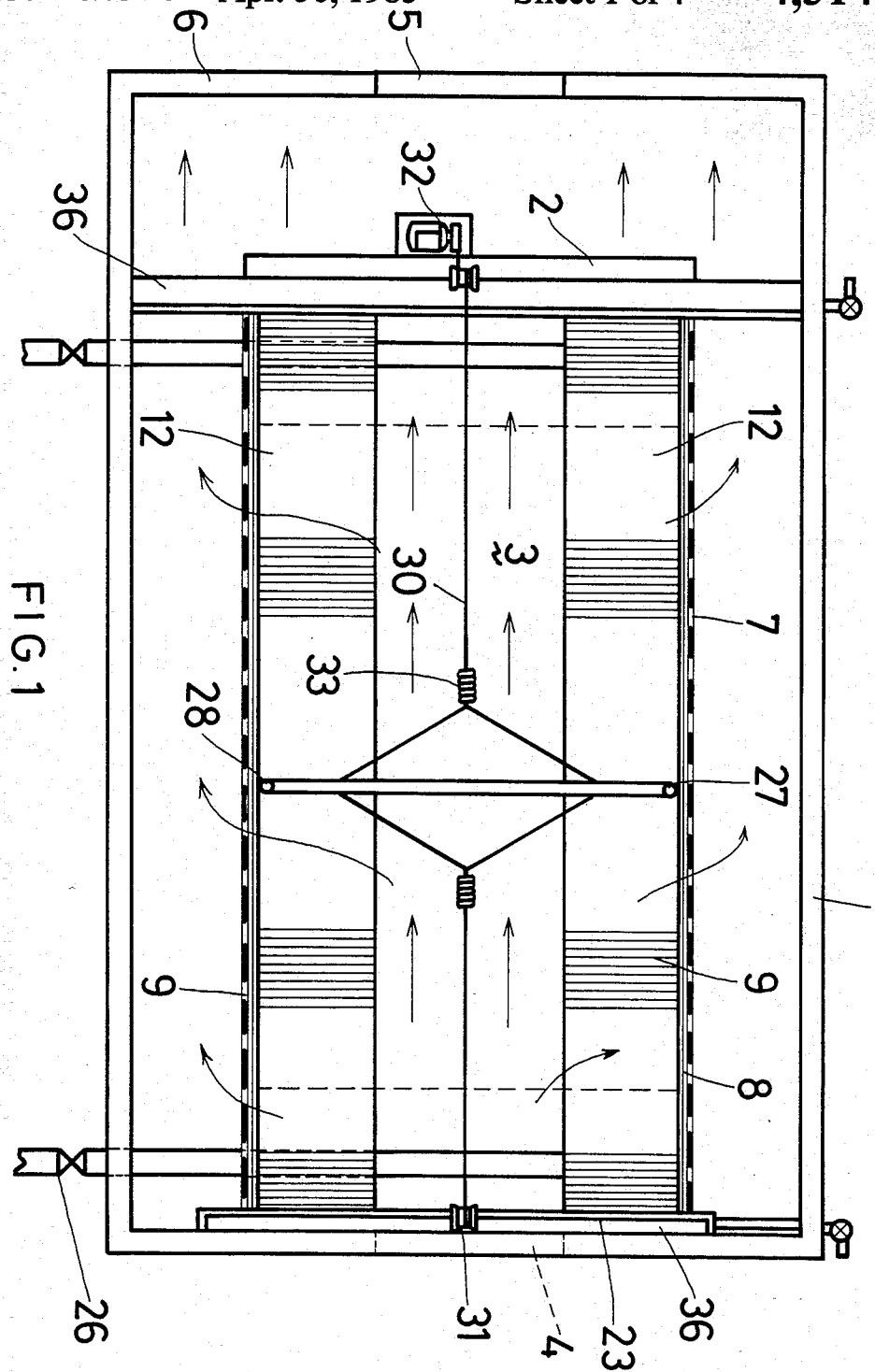

United States Patent [19]

Moore

[11] Patent Number: 4,514,303

[45] Date of Patent: Apr. 30, 1985

[54] SLUDGE TRACTION AND DESLUDGING SYSTEM

[76] Inventor: Richard P. Moore, cor. Black Reef Rd. & Moore St., Germiston, Transvaal Province, South Africa

[21] Appl. No.: 502,621

[22] Filed: Jun. 9, 1983

[51] Int. Cl.³ .............................................. B01D 21/24
[52] U.S. Cl. .................................. 210/519; 210/521; 210/525
[58] Field of Search ............... 210/519, 521, 522, 535, 210/523, 527, 802, 534, 524, 525

[56] References Cited

U.S. PATENT DOCUMENTS

| | | | |
|---|---|---|---|
| 1,918,742 | 7/1933 | Elrod | 210/527 |
| 2,861,692 | 11/1958 | Humphreys | 210/521 |
| 3,744,634 | 7/1973 | Schlenz | 210/534 |
| 4,054,520 | 10/1977 | McGivern | 210/525 |
| 4,056,477 | 11/1977 | Ravitts | 210/519 |
| 4,089,782 | 5/1978 | Huebner | 210/522 |
| 4,194,976 | 3/1980 | Robinsky | 210/521 |

FOREIGN PATENT DOCUMENTS

| | | | |
|---|---|---|---|
| 2852966 | 10/1979 | Fed. Rep. of Germany | 210/521 |
| 186088 | 11/1963 | Finland | 210/521 |
| 1329599 | 9/1973 | United Kingdom | 210/527 |

Primary Examiner—John Adee
Attorney, Agent, or Firm—Bacon & Thomas

[57] ABSTRACT

This invention relates to settlement tank installation for the clarification of liquids particularly water and including an inclined plate assembly for solids removal. The plate assembly comprises a multiplicity of flexible sheets suspended from an upper end and weighted at their lower ends which are located to give the desired angle of inclination to the sheets wherein preferably the upper ends of the sheets are connected to a fixed frame and the lower ends to a movable frame through rods extending across the frame and attached to the sheets. The assembly is installed in a tank with an inlet for liquid to be treated opening into a separating chamber, having perforated side walls next to which the inclined sheets are located and opening into an outer collection channel with the perforations extending substantially two thirds of the height of the inclined sheets and wherein an outlet for treated liquid is provided arranged to control the level of the liquid at the height of the top of the sheets in the end of the collection channel remote from the inlet. The tank also preferably including collection troughs in the floor at each end and a floor cleaning sweeper assembly comprising a blade extending across the width of the floor and connection at each side centrally to a rope passing around pulleys located at the top and bottom of each end of the separating chamber.

17 Claims, 7 Drawing Figures

SLUDGE TRACTION AND DESLUDGING SYSTEM

This invention relates to a removal of settleable solid impurities suspended in a liquid and more particularly to apparatus for the purification of water by the use of a method known as "inclined plate settlement" and to apparatus for removal of settled sludge from an elongated separating chamber.

Inclined plate settlement utilises a multiplicity of plates in a settlement tank arranged to reduce the distance travelled by particles suspended in a fluid before they reach a collecting surface and it is the object of this invention to provide an arrangement of collecting surfaces which can be adjusted with regard to inclination and also readily cleaned.

A further basic object is to provide a system for the utilisation of inexpensive flexible plastic sheets as opposed to expensive rigid plates heretofore utilised.

A further basic object of the invention is to provide means for manually or automatically removing the settled material from the sheets and the sludge from the separating chamber floor.

According to this invention there is provided an inclined plate assembly for removal of settleable solid impurities from a liquid comprising a multiplicity of flexible sheets suspended from an upper end and weighted at their lower ends which are located to give the desired angle of inclination to the sheets.

Further features of this invention provide for the sheets to be suspended from rods held in fixed spaced relationship to side frame members and for the lower ends to be similarly secured to side frame members longitudinally adjustable with respect to the upper frame. The sheets are preferably plastics material sheets with the rods threaded through slits provided at spaced intervals across the top and bottom of the sheets.

The invention also provides for the sheets to be suspended along the side walls in an elongated settlement tank having an inlet opening into an inner separating chamber having perforated side walls opening into a settled liquid collection channel with the perforations extending from the top of the inclined sheets and wherein the weir outlet from the collection channel is arranged at the height of the top of the sheets and opens into an outlet from the settlement tank. The size of the perforations through the separating chamber side walls is made to provide substantially even flow across all of the sheets in the assembly.

Still further features of this invention provide for the upper frame for the inclined sheet assembly to be supported from the separating chamber side walls with the lower frame suspended by the sheets and longitudinally adjustable in position by means of a member attached to one end of the frame.

The floor of the separating chamber is provided with sludge collection troughs at each end and a floor cleaning sweeper assembly comprising a blade extending across the width of the floor and connected at each side centrally to a rope passing around pulleys located at the top and bottom of each end of the separating chamber.

Preferably the cable is also wound round the drum of an automatically reversible power driven winch so that the blade can be drawn back and forth along the floor of the separating chamber. Guide and support means can be provided for the blade which can have a flexible floor contacting edge.

The length of cable which extends along the top of the separating chamber can support a bouyant skimmer which will operate in a similar manner to the scraper over the surface of the liquid to remove the scum from that surface.

The end troughs at the bottom of the separating chamber have sludge removal pipes located therein and are preferably divided into a series of hoppers across the width of the chamber with an upwardly directed vertical suction connection from the bottom of each hopper into a sludge removal pipe.

Figure 3:
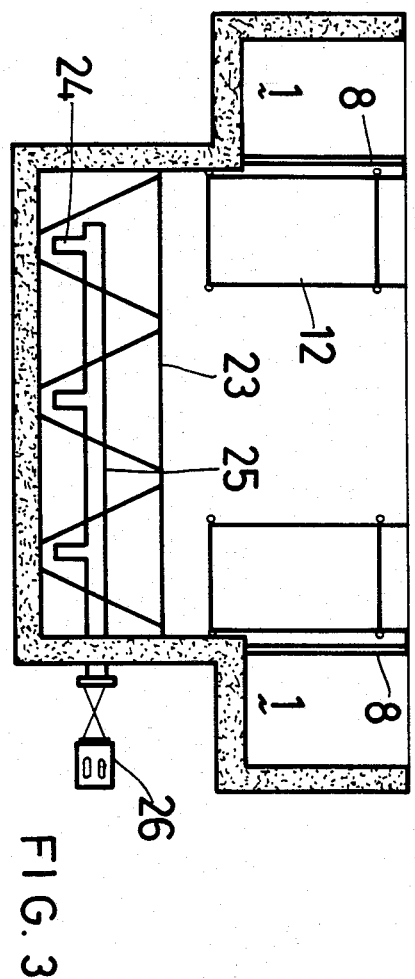
Figure 2:
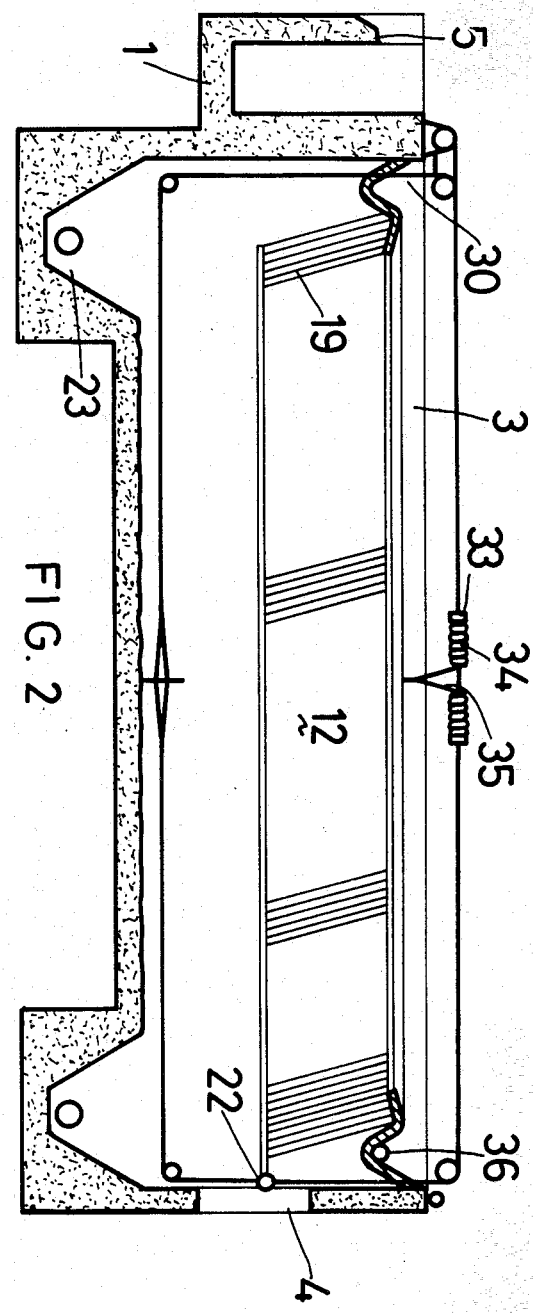
Figure 4:
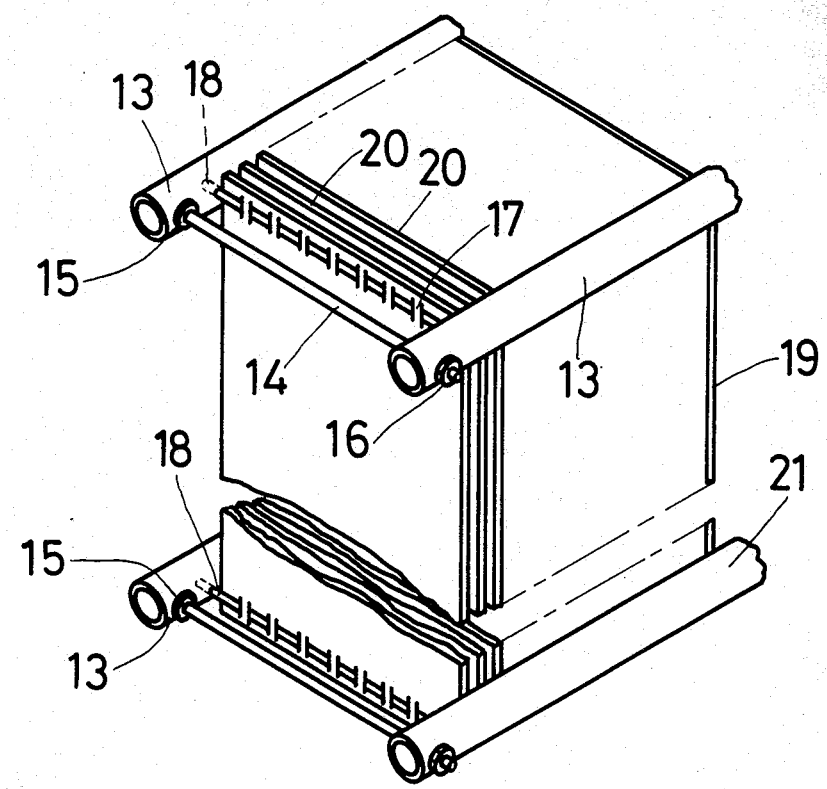
Figure 5:
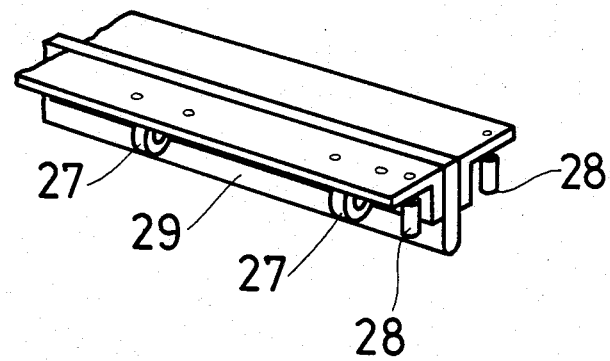
Figure 6:
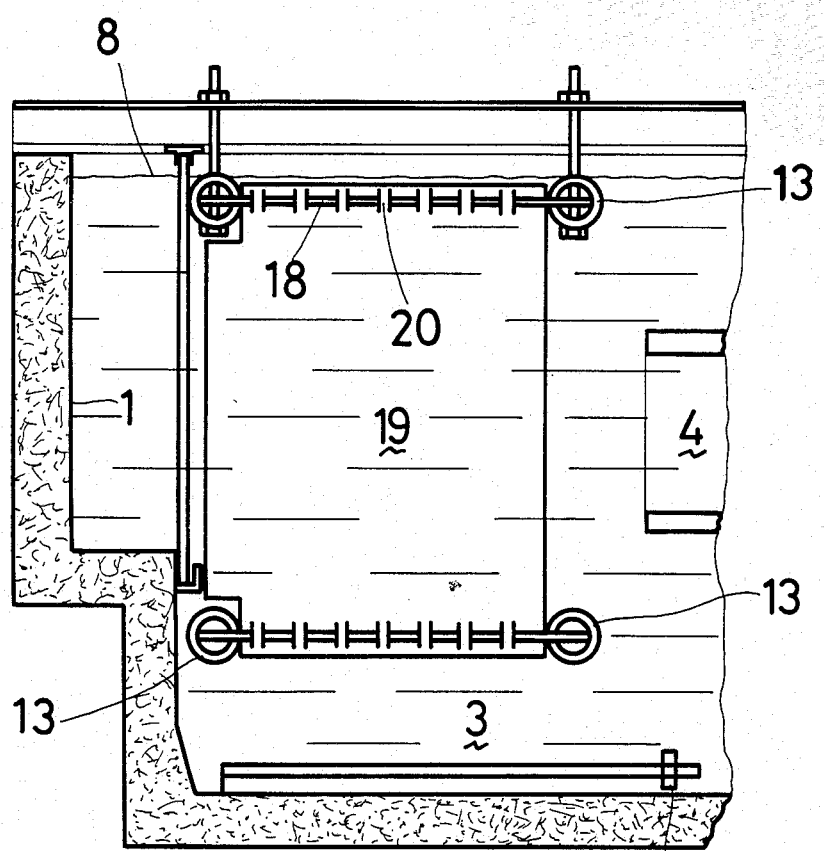
Figure 7:
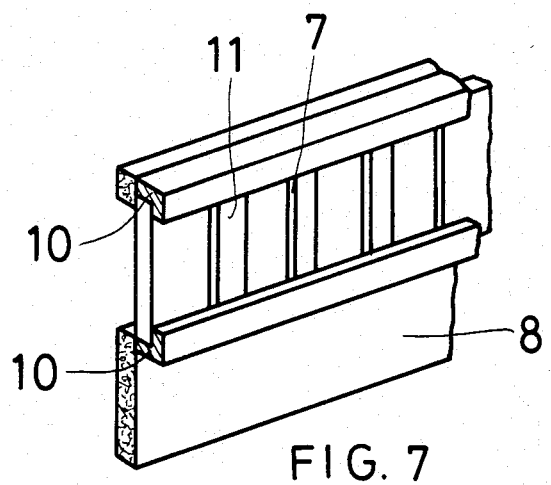

A preferred embodiment of this invention for removal of settleable solids from water will be described below with reference to the accompanying drawings in which FIG. 1 is a diagrammatic plan of a settlement tank assembly;

FIG. 2 a sectional side elevation of FIG. 1;

FIG. 3 a sectional end elevation;

FIG. 4 a detail of the sheet support;

FIG. 5 a detail of the sludge scraper blade;

FIG. 6 a detail illustrating the relationship of the inclined sheets to the separating chamber and collection channel; and FIG. 7 a detail of a side wall of the separating chamber.

As shown the settlement tank assembly is preferably built in concrete and is of elongated rectangular shape.

The assembly consists of an outer collection channel which forms a trough around the upper part of the length and one end (2) of an inner separating chamber (3) remote from the inlet (4) to the chamber (3).

The inlet (4) is positioned at the centre of one end of the chamber (3) and the outlet for clean water is over a weir (5) in the end wall (6) of the channel (1). Flow communcation between the chamber (3) and the channel (1) is effected through perforations in the form of slots (7) at spaced intervals along the length of the side walls (8) of the chamber (3).

An inclined sheet assembly indicated generally at (9) is suspended in the chamber (3) and extends downwardly into the chamber to a depth below the bottom of the collection channel (1) as can be seen in FIG. 6. The slots (7) through the side walls of the chamber (3) extend over substantially the full height of the collection channel (1).

Referring to FIG. 7 there is shown a simple method of construction of the flow communication openings through the side walls (8) of the chamber (3). Locating guide channels (10) project from the walls and retain vertical rigid slats (11) which can conveniently be made of asbestos cement material. The slats (11) are slideable in the channels (10) and can readily be positioned to provide varying widths of slots (7) between their adjacent edges and the widths are easily adjustable. Alternatively the side walls may be otherwise perforated to distribute the flow evenly throughout the inclined sheet assembly.

It will be appreciated that the water flow path through the assembly is thus through the central inlet (4) down the length of the chamber (3) laterally through the inclined plate assembly, through the slots (7) into the longitudinal section of the collection channel (1) and thence over the outlet weir (5). The size of the slots is utilised to obtain a substantially constant resistance head through the side wall along the full length thereof.

The inclined sheet assembly (9) does not extend across the full width of the chamber (3) but is made in two sections (12) one extending longitudinally down each side wall (8) adjacent the slots (7) leaving a central feed area along the length of the chamber (3).

Each section conveniently consists of a pair of longitudinally extending asbestos cement pipes (13) held at their ends in fixed space relationship bars (14) having collars (15) and threaded ends extending through the pipes to receive clamping nuts (16).

This arrangement enables a series of rods (17) to be located in fixed spaced relationship along the length of the pipes by having holes (18) oppositely disposed in the pair of pipes (13) to accommodate the ends of the rods (17) but prevent their withdrawl as longitudinal movement is prevented by the ends of the rods contacting the inner surface of the outer part of the walls of the pipes (13).

The inclined sheets (19) are made from polyvinyl chloride sheeting cut to appropriate size. The sheets are fitted to the rods (17) by threading the latter through loops (20) formed across the width of the sheets by making parallel slits through the material of the sheets adjacent their ends.

Alternatively sleeves can be formed at the ends of the sheets by folding the ends of the material over and heat sealing the ends of the body of the sheet. The rods can then be threaded through the sleeves thus formed.

The frame formed by the pipes (13) and bars (14) is removably fixed to the upper part of the separating chamber (3).

The lower ends of the sheets (19) are similarly connected to a lower frame (21) which can also conveniently be similar to the construction described for the upper ends of sheets (19). However the lower frame is freely suspended on the lower ends of the sheets to which it thereby applies tension. The inclination of the sheets can be determined by moving the lower frame (21) longitudinally with respect to the fixed frame. This can be simply efffected by having a rope attached to the lower frame and passed around a pulley (22) to be anchored on or adjacent the end wall of the chamber (3) as indicated.

To clean the sheets all that is required is for the rope to be released and the frame (21) will swing under gravity to bring the sheets (19) into vertical positions. The sludge will easily then fall from the sheets (19). This movement can be automated to occur at periodic intervals.

There are provided sludge collection troughs (23) in the bottom at each end of the tank (3). Each trough is preferably divided into a series of laterally adjacent hopper and a sludge extraction connection (24) for each hopper extending to a sludge removal pipe (25) with a control valve (26) is also provided. In this way sludge is withdrawn by lifting it under reduced pressure into the removal pipes and consequently avoiding clogging of the openings into the pipe (25).

To remove the sludge deposited from the water being clarified onto the floor of the chamber (3) a scraper assembly is provided. Referring to FIG. 5 of the drawings the scraper is made as a frame supported by rollers (27) and having guide rollers (28) or other means to contact the walls of the chamber (3) to locate the scraper. The frame can conveniently be a pair of channel sectioned members secured together to clamp between them a strip of wear resistant flexible material (29). This strip can be made of polyurethane or rubber and is of such a length that it will project below the bottom of the rollers (27). As the frame is drawn across the floor of the chamber (3) the tip of the strip will bend rearwardly and as the direction of travel is reversed the tip will flex to bend in the opposite direction. This will result in the floor of the chamber (3) being wiped clean as the scraper assembly is drawn back and forth across the floor.

It will be appreciated that alternative constructions of scraper can be used.

To move the scraper and endless rope (30) is provided. This rope (30) passes around pulleys (31) attached to the wall of chamber (3) and is attached to each side of the scraper as well as extending along the length of the chamber (3) above the water level therein. A jockey pulley can be included in the construction to maintain the desired tension in the rope but the required tension can conveniently be applied to the rope by including coil springs (33) between the ends of the rope and its connection to the scum wiper blade.

It will usually be desirable to have the scraper assembly operate automatically and to effect this a reversible winch mechanism (32) is mounted on one end wall. The rope (30) is lapped around the winch and carries stops (34). There are adapted to operate tripping mechanisms (not shown) adapted to reverse the direction of rotation of the winch. The stops (34) are located so that the sludge scraper will track down the length of the bottom chamber (3) between the troughs (23).

To remove scum from the surface of the water in chamber (3) the part of the rope which extends along the length of chamber (3) above the water can carry a bouyant skimmer (35). This will operate in a manner similar to the scraper but to clean the surface of the water. The skimmer (35) will cause the scum on the surface of the water to pass into collecting troughs (36) extending across the top of the ends of the chamber (3).

It is also preferable that the weir (5) from the collection channel (1) extend across substantially the full width of the channel to discharge into a suitable outlet channel (not shown) from the settlement tank.

In use the water to have the settleable solids removed therefrom is caused to flow as above described and passes in the main laterally between the inclined sheets. This ensures a short free fall of sludge before it lands on a collecting surface, that is the inclined sheets. Also the direction of the flow provides for a minimum counter flow between liquid and sludge removed therefrom.

The angle of inclination of the sheets, generally in excess of thirty degrees to the vertical, will be adjusted to give optimum desludging conditions under particular circumstances of application and they can be easily cleaned as set out above.

The invention provides a simple installation for separating suspended solids from liquids which can be made to operate substantially continuously and effectively with little maintenance or replacement of parts required.

What I claim as new and desire to secure by letters patent is:

1. An inclined plate assembly for removal of settleable solids from liquids comprising: a multiplicity of spaced flexible sheets weighted at their lower ends; upper means to suspend the sheets from their upper ends comprising a fixed frame to which the upper ends of the sheets are connected; lower means comprising a movable frame; and, through rods extending across the frames to which the ends of the sheets are attached such that the lower ends are movable relative to the upper ends to adjust the inclination of the sheets to the desired angle.

2. An inclined plate assembly as claimed in claim 1 in which the sheets are of plastics material with their ends attached to transverse rods.

3. An inclined plate assembly as claimed in claim 2 in which the plastics material is polyvinal chloride.

4. An inclined plate assembly as claimed in claim 1 wherein the sheets have loops provided in at least one of the upper and lower ends formed by slitting the material along parallel lines adjacent each end of the sheet such that the rods are threaded through the loops.

5. An inclined plate assembly as claimed in claim 1 further comprising mounting means to mount the upper frame in a separating chamber forming part of a settlement tank such that the sheets extend part way down the depth of the separating chamber with the lower frames freely suspended on the sheets.

6. An inclined plate assembly as claimed in claim 5 further comprising means to longitudinally adjust the lower frame by means of a rope passed round pulleys and led to a surface surround of the settling tank such that the angle of inclination of the inclined sheets may be manually adjusted.

7. A settlement tank installation comprising:
(a) means defining a separating chamber having an inlet for liquid to be directed to an elongated horizontal feed area in the chamber;
(b) means defining a collection channel having a top level controlling outlet opening;
(c) an inclined plate assembly in the separating chamber comprising:
(i) a multiplicity of spaced flexible sheet weighted at their lower ends;
(ii) upper means to suspend the sheets from their upper ends; and,
(iii) lower means connected with the lower ends of the sheets such that the lower ends are movable relative to the upper ends to adjust the inclination of the sheets to the desired angle; and,
(d) perforated side wall means disposed between the separating chamber and the collection channel adjacent to the inclined plate assembly, the perforations extending over the greater part of the height of the inclined sheets, and wherein the top level controlling outlet controls the liquid at the top of the flexible sheets.

8. A settlement tank installation as claimed in claim 7 in which the top level controlling outlet comprises an elongated weir.

9. A settlement tank installation as claimed in claim 7 in which the size of the perforations through the separating chamber side walls promotes substantially even flow across all the flexible sheets of the assembly.

10. A settlement tank installation as claimed in claim 7 in which the perforated side wall means comprise a series of slats movably retained in upper and lower formations on a side wall in a substantially vertical position such that they are movable along the length of the separating chamber to provide a perforated side wall wherein the perforations are easily adjusted in size.

11. A settlement tank installation as claimed in claim 7 having an elongated rectangular shape wherein the floor of the separating chamber defines sludge collection troughs at each end and further comprising a floor cleaning sweeper assembly comprising a blade extending across the width of the separating chamber floor and connected at each side centrally to a rope passing around pulleys located at the top and bottom of each end of the separating chamber.

12. A settlement tank installation as claimed in claim 11 further comprising an automatically reversible power driven winch having a drum about which the rope is wound and means to control the winch so as to draw the blade back and forth along the floor of the separating chamber.

13. A settlement tank installation as claimed in claim 11 in which the blade has a flexible floor contacting edge and is supported and guided on rollers.

14. A settlement tank installation as claimed in claim 11 further comprising means to divide the end collection troughs into a series of hoppers across the width of the separating chamber and an upwardly directed vertical suction connection from the bottom of each hopper into a sludge removal pipe.

15. A settlement tank installation as claimed in claim 11 further comprising a buoyant skimmer attached to the rope at the top of the separating chamber and means defining scum collection troughs are provided across the top of each end of the separating chamber.

16. A liquid-solids seperation tank installation comprising: an elongated rectangular tank with means defining an inlet for liquid to be treated directed into a central feed area; two spaced horizontal elongated rows of flexible inclined sheets located on either side of the central feed area and adjacent to perforated side outlet walls of the tank by means of which liquid is evenly drawn substantially horizontally through the inclined sheets; and means defining clarified liquid collecting channels into which the clarified liquid is delivered and which, lead to an elongated weir discharge outlet for the treated or clarifed liquid, such that the horizontal rows of inclined sheets terminate above a floor of the tank to allow for means comprising a reciprocating single rope pulled sweeper for sweeping material into sludge hoppers defined at each end of the floor of the tank and valved means to discharge sludge from the sludge hoppers.

17. A liquid-solids separation settling tank installation as claimed in claim 16 in which the same single rope reciprocating system that is used to drive the settled material sweeper system also motivates a scum skimmer at the surface of the tank liquid that skims the scum into means defining scum receiving troughs located at each end of the tank.

* * * * *